(12) United States Patent
Sten et al.

(10) Patent No.: US 10,316,946 B2
(45) Date of Patent: Jun. 11, 2019

(54) TWO MODE ELECTRIC DRIVE MODULE WITH RAVIGNEAUX GEARSET

(71) Applicant: e-AAM Driveline Systems AB, Trollhättan (SE)

(72) Inventors: Erik J. Sten, Trollhättan (SE); Gabriel Trönnberg, Trollhättan (SE)

(73) Assignee: e-AAM Driveline Systems AB, Trollhättan (SE)

( * ) Notice: Subject to any disclaimer, the term of this patent is extended or adjusted under 35 U.S.C. 154(b) by 90 days.

(21) Appl. No.: 15/783,025

(22) Filed: Oct. 13, 2017

(65) Prior Publication Data

US 2019/0113120 A1   Apr. 18, 2019

(51) Int. Cl.
| | |
|---|---|
| *F16H 37/08* | (2006.01) |
| *B60K 17/16* | (2006.01) |
| *F16H 1/28* | (2006.01) |
| *F16H 48/08* | (2006.01) |
| *B60K 1/02* | (2006.01) |

(52) U.S. Cl.
CPC .......... *F16H 37/0806* (2013.01); *B60K 1/02* (2013.01); *B60K 17/16* (2013.01); *F16H 1/28* (2013.01); *F16H 48/08* (2013.01); *F16H 2001/2872* (2013.01)

(58) Field of Classification Search
CPC ...... F16H 37/082; F16H 37/0806; F16H 1/36; F16H 1/28; B60K 1/02; B60K 17/16
See application file for complete search history.

(56) References Cited

U.S. PATENT DOCUMENTS

| | | |
|---|---|---|
| 4,831,890 A | 5/1989 | Valentin et al. |
| 4,862,770 A | 9/1989 | Smith |
| 4,962,969 A | 10/1990 | Davis |
| 5,242,336 A | 9/1993 | Hori |
| 5,415,598 A | 5/1995 | Sawase et al. |
| 5,518,463 A | 5/1996 | Shibahata et al. |
| 5,518,464 A | 5/1996 | Teraoka |
| 5,588,328 A | 12/1996 | Nihei et al. |
| 5,637,050 A | 6/1997 | Chludek |

(Continued)

FOREIGN PATENT DOCUMENTS

| | | |
|---|---|---|
| DE | 811650 | 8/1951 |
| DE | 102004015278 A1 | 10/2005 |

(Continued)

*Primary Examiner* — Stacey A Fluhart
(74) *Attorney, Agent, or Firm* — Harness, Dickey & Pierce, P.L.C.

(57) ABSTRACT

A drive module includes a Ravigneaux gearset, first and second input shafts, shift member, and differential. The first planet gears of the gearset can engage the first sun gear and the second planet gears, which can engage the second sun gear. The first input shaft can rotate with the second sun gear and receives torque from a first motor. A first gear can be coupled to the carrier of the Ravigneaux gearset for rotation therewith and meshingly engages the differential input. The second input shaft receives torque from a second motor and is drivingly coupled to the differential input. When the shift member is in a first position, the shift member drivingly couples the first sun gear to a first differential output. When the shift member is in a second position, the shift member couples the first sun gear to a housing to prevent rotation of the first sun gear.

18 Claims, 4 Drawing Sheets

(56) References Cited

U.S. PATENT DOCUMENTS

| | | | |
|---|---|---|---|
| 5,696,680 A | 12/1997 | Ichioka et al. | |
| 6,027,424 A | 2/2000 | Reynolds | |
| 6,098,737 A | 8/2000 | Aoki | |
| 6,105,704 A | 8/2000 | Hamada et al. | |
| 6,120,407 A | 9/2000 | Mimura | |
| 6,123,640 A | 9/2000 | Schulz | |
| 6,325,736 B1 | 12/2001 | Hamada et al. | |
| 6,484,834 B2 | 11/2002 | Bowen et al. | |
| 6,540,636 B2 | 4/2003 | Amanuma et al. | |
| 6,595,308 B2 | 7/2003 | Bowen | |
| 6,609,993 B2 | 8/2003 | Ohkubo et al. | |
| 6,691,013 B1 | 2/2004 | Brown | |
| 6,863,636 B2 | 3/2005 | Huber et al. | |
| 6,909,959 B2 | 6/2005 | Hallowell | |
| 7,081,063 B2 | 7/2006 | Hori et al. | |
| 7,104,617 B2 | 9/2006 | Brown | |
| 7,216,732 B2 | 5/2007 | Angerer et al. | |
| 7,223,198 B2 | 5/2007 | Kimes et al. | |
| 7,238,140 B2 | 7/2007 | Gradu | |
| 7,270,205 B2 | 9/2007 | Sakai et al. | |
| 7,311,631 B2 | 12/2007 | Kushino | |
| 7,399,247 B2 | 7/2008 | Kempf et al. | |
| 7,491,147 B2 | 2/2009 | Ross | |
| 7,553,251 B2 | 6/2009 | Nett et al. | |
| 7,628,721 B2 | 12/2009 | Yamamura et al. | |
| 7,801,657 B2 | 9/2010 | Piyabongkarn et al. | |
| 7,867,125 B2 | 1/2011 | Kim et al. | |
| 7,873,454 B2 | 1/2011 | Piyabongkarn et al. | |
| 7,874,395 B2 | 1/2011 | Taji et al. | |
| 8,049,384 B2 | 11/2011 | Wilton et al. | |
| 8,057,352 B2 | 11/2011 | Nishiji | |
| 8,206,258 B2 | 6/2012 | Ziemer | |
| 8,409,425 B2 | 4/2013 | Forrow et al. | |
| 8,480,532 B2 | 7/2013 | Biermann et al. | |
| 8,545,359 B2 | 10/2013 | Kato et al. | |
| 8,554,441 B1 | 10/2013 | Johansson et al. | |
| 8,591,371 B2 | 11/2013 | Dinter et al. | |
| 8,663,051 B2 | 3/2014 | Sten | |
| 8,672,790 B2 | 3/2014 | Severinsson et al. | |
| 8,788,144 B2 | 7/2014 | Krueger et al. | |
| 8,795,121 B2 | 8/2014 | Klomp | |
| 8,862,356 B2 | 10/2014 | Miller | |
| 8,893,572 B2 | 11/2014 | Wu et al. | |
| 8,998,765 B2 | 4/2015 | Sten | |
| 9,400,034 B1 * | 7/2016 | Pritchard | B60K 1/00 |
| 9,719,585 B2 | 8/2017 | Sten | |
| 9,958,049 B1 * | 5/2018 | Sten | F16H 48/36 |
| 2001/0031682 A1 | 10/2001 | Auer et al. | |
| 2002/0061801 A1 | 5/2002 | Amanuma et al. | |
| 2002/0077217 A1 | 6/2002 | Presley | |
| 2003/0203782 A1 | 10/2003 | Casey et al. | |
| 2004/0046448 A1 | 3/2004 | Brown | |
| 2004/0048710 A1 | 3/2004 | Tumback | |
| 2004/0069542 A1 | 4/2004 | Simmons et al. | |
| 2004/0089089 A1 | 5/2004 | Stevens et al. | |
| 2004/0248695 A1 | 12/2004 | Wang et al. | |
| 2005/0006164 A1 | 1/2005 | Teraoka | |
| 2005/0176546 A1 | 8/2005 | Fujita et al. | |
| 2006/0025273 A1 | 2/2006 | Gradu | |
| 2006/0079370 A1 | 4/2006 | Kushino | |
| 2006/0276292 A1 | 12/2006 | Puiu | |
| 2006/0293141 A1 * | 12/2006 | Sharma | B60K 23/04 475/204 |
| 2007/0060432 A1 | 3/2007 | Van Druten et al. | |
| 2007/0087889 A1 | 4/2007 | Rosemeier et al. | |
| 2007/0123383 A1 | 5/2007 | Yokoyama et al. | |
| 2007/0135255 A1 | 6/2007 | Kim et al. | |
| 2007/0213162 A1 | 9/2007 | Takasaki | |
| 2007/0249456 A1 | 10/2007 | Meixner | |
| 2007/0256869 A1 * | 11/2007 | Kozarekar | B60K 6/365 180/65.235 |
| 2007/0259749 A1 | 11/2007 | Ross | |
| 2007/0265130 A1 | 11/2007 | Bowen | |
| 2008/0064552 A1 | 3/2008 | Tangl | |
| 2008/0113842 A1 | 5/2008 | Kinoshita et al. | |
| 2008/0176702 A1 | 7/2008 | Showalter | |
| 2008/0182695 A1 | 7/2008 | Showalter | |
| 2008/0300080 A1 | 12/2008 | Thompson | |
| 2009/0038866 A1 | 2/2009 | Abe et al. | |
| 2009/0111641 A1 | 4/2009 | Kim et al. | |
| 2009/0112430 A1 | 4/2009 | Showalter | |
| 2009/0118051 A1 | 5/2009 | Bock et al. | |
| 2009/0188732 A1 | 7/2009 | Janson | |
| 2009/0197727 A1 | 8/2009 | Janson | |
| 2009/0215576 A1 | 8/2009 | Nishiji | |
| 2009/0221396 A1 | 9/2009 | Berg et al. | |
| 2009/0253548 A1 | 10/2009 | Showalter | |
| 2009/0280948 A1 | 11/2009 | Fuhrer et al. | |
| 2010/0234162 A1 | 9/2010 | Troennberg | |
| 2010/0261565 A1 * | 10/2010 | Ai | B60K 6/365 475/5 |
| 2010/0263950 A1 | 10/2010 | Larsson et al. | |
| 2011/0125382 A1 | 5/2011 | Bonfigt et al. | |
| 2011/0243740 A1 | 10/2011 | Siegfriedsen | |
| 2011/0256977 A1 | 10/2011 | Hart et al. | |
| 2011/0276245 A1 | 11/2011 | Krueger et al. | |
| 2012/0083384 A1 | 4/2012 | Ziemer et al. | |
| 2012/0088628 A1 | 4/2012 | Ziemer et al. | |
| 2012/0133202 A1 | 5/2012 | Mui et al. | |
| 2013/0145875 A1 | 6/2013 | Wu et al. | |
| 2013/0150205 A1 | 6/2013 | Wu et al. | |
| 2013/0199323 A1 | 8/2013 | Fong et al. | |
| 2013/0203543 A1 | 8/2013 | Sten | |
| 2014/0257664 A1 | 9/2014 | Arbitmann et al. | |
| 2014/0358397 A1 | 12/2014 | Gao et al. | |
| 2014/0364264 A1 | 12/2014 | Sten | |
| 2016/0138659 A1 | 5/2016 | Strandberg | |

FOREIGN PATENT DOCUMENTS

| | | |
|---|---|---|
| GB | 2466968 | 7/2010 |
| WO | WO-2011076542 A1 | 6/2011 |
| WO | WO-2015185304 A1 | 12/2015 |

* cited by examiner

TWO MODE ELECTRIC DRIVE MODULE WITH RAVIGNEAUX GEARSET

FIELD

The present disclosure relates to a two mode electric drive module with a Ravigneaux gearset.

BACKGROUND

U.S. Pat. No. 8,663,051 discloses an electric drive module having a transmission with a two-stage planetary transmission having a pair of sun gears that are coupled to one another for common rotation and a pair of internal gears. A first one of the internal gears is fixedly coupled to a housing of the drive module, while the other one of the internal gears is rotatable relative to the housing of the drive module. The internal gears are rather large and as such, are relatively costly to manufacture. Accordingly, there exists a need for improved electric drive modules.

SUMMARY

This section provides a general summary of the disclosure, and is not a comprehensive disclosure of its full scope or all of its features.

In one form, the present disclosure provides a drive module for a vehicle. The drive module can include a Ravigneaux gearset, a first input shaft, a differential assembly, a first gear, a second input shaft, and a shift member. The Ravigneaux gearset can have a carrier, a first sun gear, a second sun gear, a plurality of first planet gears and a plurality of second planet gears. The first and second planet gears can be supported by the carrier for rotation with the carrier about a first axis. The first planet gears can be rotatable relative to the carrier and meshingly engaged to the first sun gear and the second planet gears. The second planet gears can be rotatable relative to the carrier and meshingly engaged to the second sun gear. The first input shaft can be coupled to the second sun gear for rotation therewith about the first axis and can be adapted to receive torque from a first electric motor. The differential assembly can have a differential input, a first differential output, and a second differential output. The first gear can be coupled to the carrier for rotation therewith and can be meshingly engaged with the differential input. The second input shaft can be adapted to receive torque from a second electric motor. The second input shaft can be drivingly coupled to the differential input. The shift member can be movable between a first position and a second position. When the shift member is in the first position, the shift member can drivingly couple the first sun gear to the first differential output. When the shift member is in the second position, the shift member can couple the first sun gear to a housing of the drive module to prevent rotation of the first sun gear about the first axis.

According to a further embodiment, the first and second planet gears can be journally supported by the carrier.

According to a further embodiment, the differential input can be supported for rotation about a second axis that is offset and parallel to the first axis.

According to a further embodiment, the second input shaft can be disposed about a second axis that is offset and parallel to the first axis.

According to a further embodiment, the drive module can further include a first electric motor and a second electric motor. The first electric motor can be drivingly coupled to the first input shaft. The second electric motor can be drivingly coupled to the second input shaft.

According to a further embodiment, the first electric motor can be disposed about the first axis and the second electric motor can be disposed about a second axis that is offset and parallel to the first axis.

According to a further embodiment, the drive module can further include a second gear and a reduction gearset. The second gear can be coupled to the second input shaft for rotation therewith. The reduction gearset can include an input gear and an output gear. The input gear can be meshingly engaged with the second gear. The output gear can be drivingly coupled to the input gear and meshingly engaged with the differential input.

According to a further embodiment, the input gear can be coupled to the output gear for common rotation about a second axis that is offset and parallel to the first axis.

According to a further embodiment, the shift member can be movable to an intermediate position. When the shift member is in the intermediate position, the first sun gear can be rotatable about the first axis and is not drivingly coupled to the first differential output.

According to a further embodiment, the drive module can further include a second gear and a third gear. The second gear can be disposed about the first axis and can be meshingly engaged with the third gear. The third gear can be coupled to the first differential output for common rotation therewith.

According to a further embodiment, the shift member can be an annular collar disposed about the first axis and can include a plurality of first splines. When the shift member is in the first position, the first splines can matingly engage a plurality of second splines and a plurality of third splines. The second splines can be coupled to the first sun gear for common rotation. The third splines can be coupled to the second gear for common rotation therewith. When the shift member is in the second position, the first splines can matingly engage the second splines and a plurality of fourth splines that are nonrotatably coupled to a housing of the drive module.

According to a further embodiment, the differential assembly can include a differential case and a differential gearset received in the differential case. The differential gearset can include a first side gear, a second side gear, and a plurality of differential pinons that are meshingly engaged to the first and second side gears. The first side gear can be coupled to the first differential output for rotation therewith. The second side gear can be coupled to the second differential output for rotation therewith.

In another form, the present disclosure provides a drive module for a vehicle. The drive module can include a Ravigneaux gearset, a first input shaft, a differential assembly, a first gear, a second gear, a second input shaft, and a shift member. The Ravigneaux gearset can have a carrier, a first sun gear, a second sun gear, a plurality of first planet gears and a plurality of second planet gears. The first and second planet gears can be journally supported by the carrier for rotation with the carrier about a first axis. The first planet gears can be meshingly engaged to the first sun gear and the second planet gears. The second planet gears can be meshingly engaged to the second sun gear. The first input shaft can be coupled to the second sun gear for rotation therewith about the first axis and adapted to receive torque from a first electric motor. The differential assembly can have a differential input, a first differential output, and a second differential output. The differential input, first differential output, and second differential output can be rotatable about a second axis that is parallel to and offset from the first axis. The first gear can be coupled to the carrier for rotation therewith about the first axis. The first gear can be meshingly engaged with the differential input. The second gear can be coupled to the first differential output for rotation therewith about the second axis. The second input shaft can be disposed about a third axis that is parallel to and offset from the first axis. The second input shaft can be adapted to receive torque from a second electric motor and drivingly coupled to the differential input. The shift member can be disposed about the first axis and axially movable between a first position and a second position. When the shift member is in the first position, the shift member can transmit torque between the first sun gear and the second gear. When the shift member is in the second position, the shift member couples the first sun gear to a non-rotatable member of the drive module to prevent rotation of the first sun gear about the first axis.

According to a further embodiment, the drive module can further include a first electric motor and a second electric motor. The first electric motor can be drivingly coupled to the first input shaft. The second electric motor can be drivingly coupled to the second input shaft.

According to a further embodiment, the first electric motor can be disposed about the first axis and the second electric motor is disposed about the third axis.

According to a further embodiment, the drive module can further include a third gear and a reduction gearset. The third gear can be coupled to the second input shaft for rotation therewith. The reduction gearset can include an input gear and an output gear. The input gear can be meshingly engaged with the third gear. The output gear can be drivingly coupled to the input gear and meshingly engaged with the differential input.

According to a further embodiment, the input gear can be coupled to the output gear for common rotation about a fourth axis that is offset and parallel to the first, second, and third axes.

According to a further embodiment, the shift member can be movable to an intermediate position. When the shift member is in the intermediate position, the first sun gear can be rotatable about the first axis and is not drivingly coupled to the second gear.

According to a further embodiment, the drive module can further include a third gear rotatable about the first axis and meshingly engaged with the second gear. The shift member can include a plurality of first splines. When the shift member is in the first position, the first splines can matingly engage a plurality of second splines and a plurality of third splines. The second splines can be coupled to the first sun gear for common rotation. The third splines can be coupled to the third gear for common rotation therewith. When the shift member is in the second position, the first splines can matingly engage the second splines and a plurality of fourth splines that are fixedly coupled to the non-rotatable member of the drive module.

According to a further embodiment, the drive module can further include an output shaft. The output shaft can be coupled to the first sun gear for rotation therewith and can extend axially through the first and third gears.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
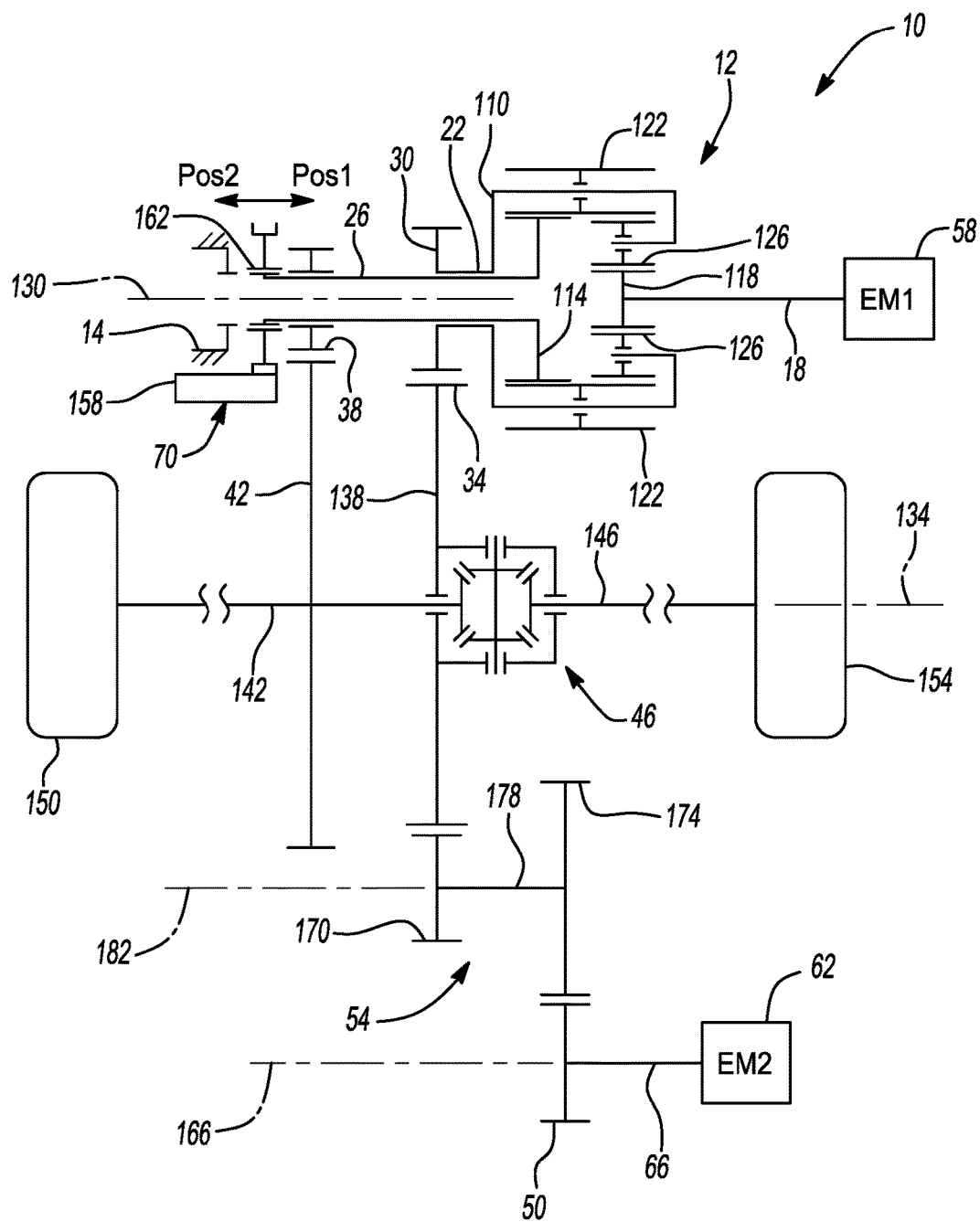
FIG. 1 is a schematic illustration of a drive module constructed in accordance with the teachings of the present disclosure.
Figure 2:
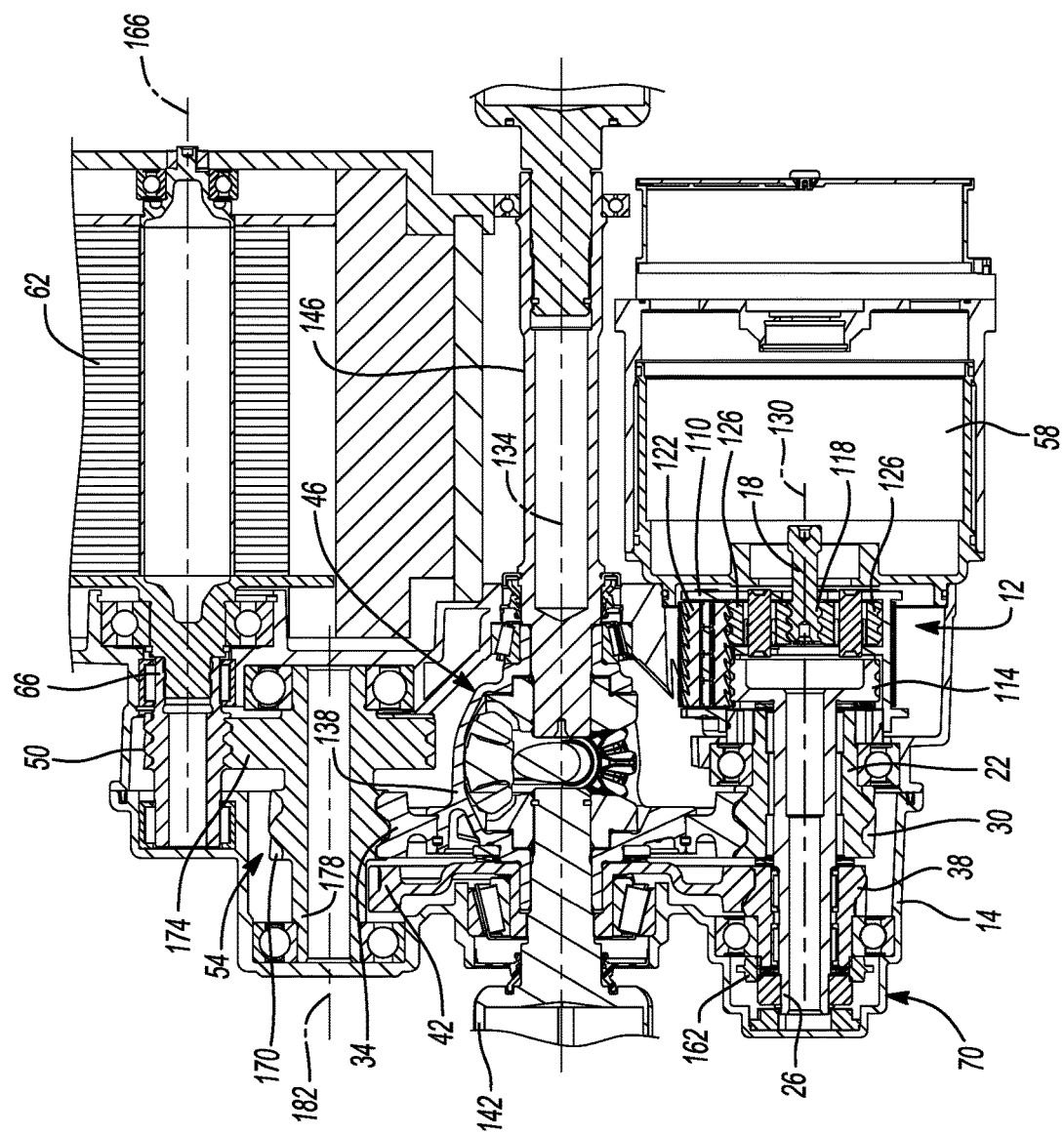
FIG. 2 is a sectional view of the drive module of FIG. 1.

With reference to FIG. 1, a drive module constructed in accordance with the teachings of the present disclosure is schematically illustrated and generally indicated by reference numeral 10. FIG. 2 shows a sectional view of an example of the drive module 10. With reference to FIGS. 1 and 2, the drive module 10 can include a Ravigneaux gearset 12, a housing 14, a first input shaft 18, a first output shaft 22, a second output shaft 26, a first gear 30, a second gear 34, a third gear 38, a fourth gear 42, a differential assembly 46, a fifth gear 50, a reduction gearset 54, a first electric motor 58, a second electric motor 62, a second input shaft 66, and a shift mechanism 70. While shown in one example configuration in FIG. 2, it will be appreciated that some or all of the components of the drive module 10 can be received in the housing 14, or other housing arrangements can be used.

The Ravigneaux gearset 12 can have a carrier 110, a first sun gear 114, a second sun gear 118, a plurality of first planet gears 122, and a plurality of second planet gears 126 that can be configured to rotate about a first axis 130. The first planet gears 122 can be journally supported by the carrier 110 and drivingly coupled to the first sun gear 114. The first planet gears 122 can be meshingly engaged to the first sun gear 114 and to the second planet gears 126. The second planet gears 126 can be journally supported by the carrier 110 and meshingly engaged with the second sun gear 126.

The first electric motor 58 can be configured to output rotary power to the second sun gear 118. In the example provided, the output shaft of the first electric motor 58 is the first input shaft 18 and the second sun gear 118 is coupled for common rotation about the first axis 130 with the first input shaft 18. Accordingly, the first electric motor 58 can be disposed about the first axis 130.

The first gear 30 can be configured to receive rotary power from the carrier 110. In the example provided, the first gear 30 and the carrier 110 are coupled to the first output shaft 22 for common rotation about the first axis 130. In the example provided, the first gear 30 is disposed on an opposite axial side of the Ravigneaux gearset 12 as the first electric motor 58, though other configurations can be used.

The second gear 34 can be meshingly engaged to the first gear 30 and rotatable about a second axis 134 that can be parallel to and offset from the first axis 130. The differential assembly 46 can generally include a differential input 138, a first differential output 142 and a second differential output 146. The differential input 138 can be coupled to the second gear 34 for rotation therewith. In the example provided, the differential assembly 46 comprises a differential case, which is the differential input 138 in this example, and a differential gearset that is received in the differential case. The differential gearset can include a plurality of differential pinions that are meshingly engaged to first and second side gears (e.g., bevel gears). The first side gear can be coupled to (e.g., integrally and unitarily formed with) the first differential output 142 for rotation therewith about the second axis 134, while the second side gear can be coupled to (e.g., unitarily and integrally formed with) the second differential output 146 for rotation therewith about the second axis 134. The first differential output 142 can be drivingly coupled to a first vehicle wheel 150, while the second differential output 146 can be drivingly coupled to a second vehicle wheel 154.

The fourth gear 42 can be coupled to the first differential output for common rotation about the second axis 134. The second output shaft 26 can be configured to receive rotary power from the first sun gear 114. In the example provided, the second output shaft 26 is coupled to the first sun gear 114 for common rotation about the first axis 130. The third gear 38 can be rotatable about the first axis 130. In the example provided, the third gear 38 is disposed about the second output shaft 26 and can be rotatable about the first axis 130 relative to the second output shaft 26. The third gear 38 can be meshingly engaged with the fourth gear 42.

The shift mechanism 70 can include an actuator 158 and a shift member 162. The actuator 158 can be configured to selectively move the shift member 162 between a first position and a second position. The actuator 158 can be any suitable actuator configured to move the shift member axially, such as a hydraulic actuator, or a screw-type actuator for example. In the example provided, the shift member 162 is a collar with a plurality of internal splines that is rotatable about the first axis 130. When the shift member 162 is in the first position, the shift member 162 can transmit rotary power between the second output shaft 26 and the third gear 38. In the example provided, when the shift member 162 is in the first position, the splines of the shift member 162 meshingly engage mating sets of external splines non-rotatably coupled to the second output shaft 26 and the third gear 38. When the shift member 162 is in the second position, the shift member can inhibit the second output shaft 26 from rotating about the first axis 130 while permitting the third gear 38 to rotate about the first axis 130. In the example provided, when the shift member 162 is in the second position, the splines of the shift member 162 meshingly engage the external splines of the second output shaft 26 and a mating set of external splines on the housing 14 of the drive module 10.

In the example provided, the actuator 158 can also be configured to move the shift member 162 to an intermediate position where the second output shaft 26 can rotate about the first axis 130 relative to the third gear 38 and relative to the housing 14 of the drive module 10. When the shift member 162 of the example provided is in the intermediate position, the splines of the shift member 162 are matingly engaged with the splines of the second output shaft 26 but not engaged with the splines of the housing 14 or the third gear 38.

The second electric motor 62 can be configured to output rotary power to the differential input 138. In the example provided, the output shaft of the second electric motor 62 is the second input shaft 66 and the fifth gear 50 is coupled for common rotation about the a third axis 166 with the second input shaft 66. The third axis 166 can be parallel to and offset from the first and second axes 130, 134. Accordingly, the second electric motor 62 can be disposed about the third axis 166. The fifth gear 50 can be drivingly coupled to the differential input 138 by the reduction gearset 54.

The reduction gearset 54 can be any suitable gearset configured to receive rotary power at a first rotational speed and output rotary power at a second rotational speed that is less than the first rotational speed. In the example provided, the reduction gearset 54 includes a sixth gear 170 and a seventh gear 174 coupled together by an intermediate shaft 178 for common rotation about a fourth axis 182. The fourth axis 182 can be parallel to and offset from the first, second, and third axes 130, 134, 166. In the example provided, the seventh gear 174 has more teeth than the sixth gear 170. The seventh gear 174 can be meshingly engaged with the fifth gear 50 and the sixth gear 170 can be meshingly engaged with the second gear 34. Thus, the reduction gearset 54 can receive torque from the second electric motor 62 and output torque to the differential assembly 46.

The drive module 10 can be operated in a propulsion mode, in which the shift member 162 is in the intermediate position and propulsive power can be provided by the second electric motor 62 to drive the second input shaft 66. In the propulsion mode, rotation of the second input shaft 66 causes corresponding rotation of the fifth gear 50, which drives the second gear 34 and the differential input 138 via the reduction gearset 54. In this mode of operation, the first electric motor 58 is not operated and the Ravigneaux gearset 12, and the third and fourth gears 38, 42 do not affect the rotary power that is applied to the first and second vehicle wheels 150, 154 by the differential assembly 46.

Figure 3:
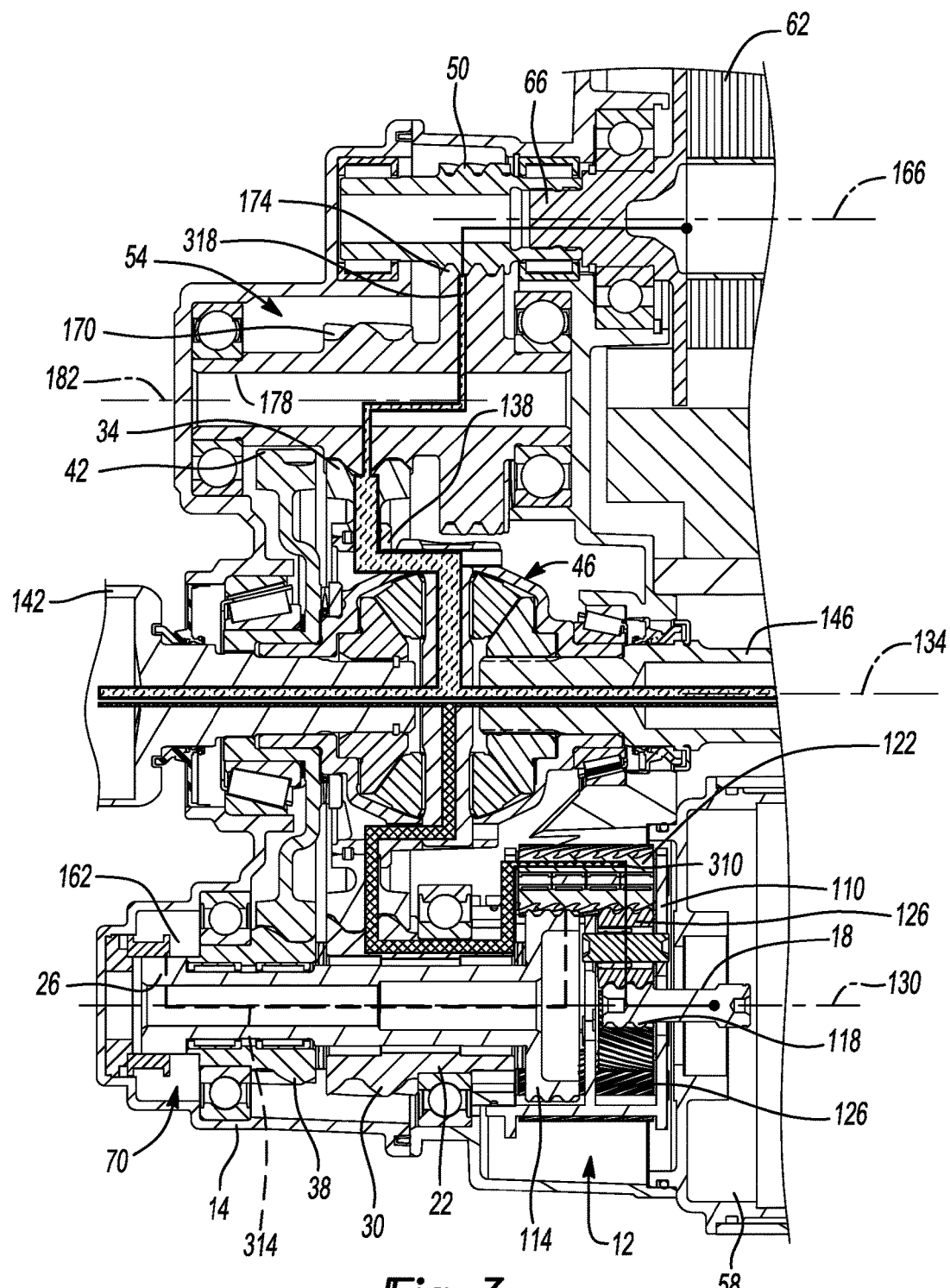
FIG. 3 is a cross-sectional view of a portion of the drive module of FIG. 2, illustrating torque transmission paths when the drive module is operated in a first mode.

With additional reference to FIG. 3, in situations where additional propulsive torque would be advantageous, the drive module 10 can be operated in a torque boost mode. In the torque boost mode, the shift member 162 can be in the second position and propulsive power can be provided by the first and second electric motors 58, 62 to the differential input 138. In FIG. 3, the path of torque provided by the first electric motor 58 is shown by the line 310 (line filled with cross-hatching) starting at the first input shaft 18 and split by the differential assembly 46 to the first and second differential outputs 142, 146. The relative amount of torque provided by the first electric motor 58 along this torque path is generally indicated by the thickness of the line 310. As illustrated by the dashed line 314, the first sun gear 114 is non-rotatably coupled to the housing 14 in this mode. The path of torque provided by the second electric motor 62 is shown by the line 318 (line filled with curved dashes) starting at the second input shaft 66 and split by the differential assembly 46 to the first and second differential outputs 142, 146. The relative amount of torque provided by the second electric motor 62 along this torque path is indicated by the thickness of the line 318.

Figure 4:
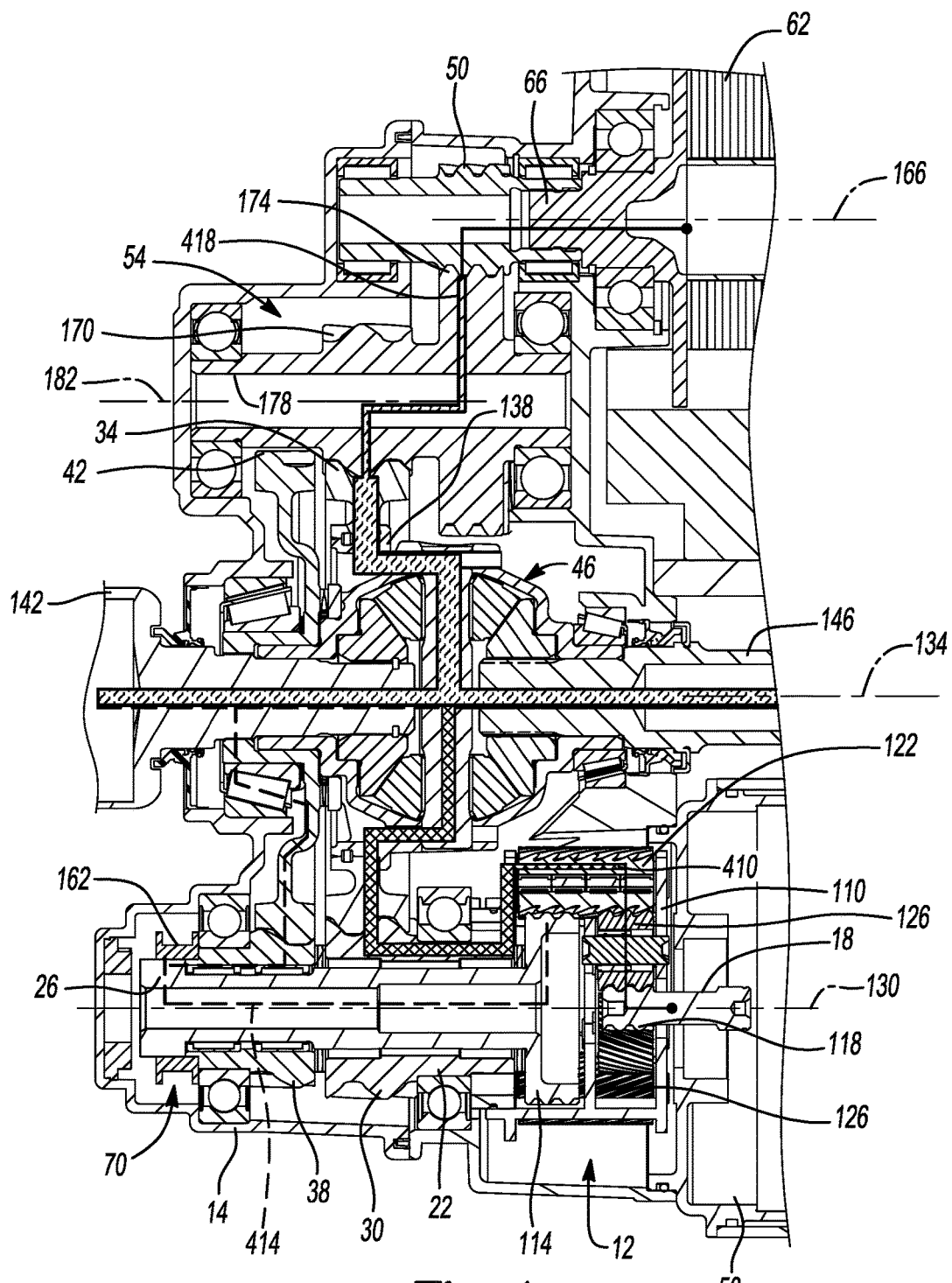
FIG. 4 is a cross-sectional view similar to FIG. 3, illustrating torque transmission paths when the drive module is operated in a second mode.

With additional reference to FIG. 4, in situations where it would be advantageous to apply different torque moments to the first and second vehicle wheels 150, 154, the drive module 10 can be operated in a torque vectoring mode. In the torque vectoring mode, the shift member 162 can be in the first position and rotary power can be provided by the first and second electric motors 58, 62. The first electric motor 58 can be driven in a forward or reverse direction with a desired amount of torque to provide a desired torque to the first differential output 142. In this mode of operation, the Ravigneaux gearset 12 functions to apply different torque moments to the first and second vehicle wheels 150, 154. In FIG. 4, the path of torque provided by the first electric motor 58 is shown by the line 410 (line filled with cross-hatching) starting at the first input shaft 18 and split by the differential assembly 46 to the first and second differential outputs 142, 146 and by the line 414 (dashed line) starting at the first sun gear 114 and proceeding to the first differential output 142. The relative amounts of torque provided by the first electric motor 58 along these torque paths are generally indicated by the thickness of the lines 410, 414. The path of torque provided by the second electric motor 62 is shown by the line 418 (line filled with curved dashes) starting at the second input shaft 66 and split by the differential assembly 46 to the first and second differential outputs 142, 146. The relative amount of torque provided by the second electric motor 62 along this torque path is indicated by the thickness of the line 418. In the torque vectoring mode, the gear arrangement can allow torque vectoring with the first electric motor 58 not rotating, or rotating at a relatively slow speed, while still providing overall torque vectoring from the differential outputs 142, 146. Thus, the input electrical power used by the first electric motor 58 can be minimized depending on the output torque needed and/or the torque distribution needed.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A drive module for a vehicle, the drive module comprising:
   a Ravigneaux gearset having a carrier, a first sun gear, a second sun gear, a plurality of first planet gears and a plurality of second planet gears, the first and second planet gears being supported by the carrier for rotation with the carrier about a first axis, the first planet gears being rotatable relative to the carrier and meshingly engaged to the first sun gear and the second planet gears, the second planet gears being rotatable relative to the carrier and meshingly engaged to the second sun gear;
   a first input shaft coupled to the second sun gear for rotation therewith about the first axis and adapted to receive torque from a first electric motor;
   a differential assembly having a differential input, a first differential output, and a second differential output;
   a first gear coupled to the carrier for rotation therewith and meshingly engaged with the differential input;
   a second input shaft adapted to receive torque from a second electric motor, the second input shaft being drivingly coupled to the differential input; and
   a shift member movable between a first position and a second position, wherein when the shift member is in the first position the shift member drivingly couples the first sun gear to the first differential output, and wherein when the shift member is in the second position the shift member couples the first sun gear to a housing of the drive module to prevent rotation of the first sun gear about the first axis.

2. The drive module of claim 1, wherein the first and second planet gears are journally supported by the carrier.

3. The drive module of claim 1, wherein the differential input is supported for rotation about a second axis that is offset and parallel to the first axis.

4. The drive module of claim 1, wherein the second input shaft is disposed about a second axis that is offset and parallel to the first axis.

5. The drive module of claim 1, further comprising:
   a second gear coupled to the second input shaft for rotation therewith; and
   a reduction gearset including an input gear and an output gear, the input gear being meshingly engaged with the second gear, the output gear being drivingly coupled to the input gear and meshingly engaged with the differential input.

6. The drive module of claim 5, wherein the input gear is coupled to the output gear for common rotation about a second axis that is offset and parallel to the first axis.

7. The drive module of claim 1, wherein the shift member is movable to an intermediate position, when the shift member is in the intermediate position the first sun gear is rotatable about the first axis and is not drivingly coupled to the first differential output.

8. The drive module of claim 1, further comprising a second gear and a third gear, the second gear being disposed about the first axis and meshingly engaged with the third gear, the third gear being coupled to the first differential output for common rotation therewith.

9. The drive module of claim 8, wherein the shift member is an annular collar disposed about the first axis and includes a plurality of first splines, wherein when the shift member is in the first position the first splines matingly engage a plurality of second splines and a plurality of third splines, the second splines being coupled to the first sun gear for common rotation, the third splines being coupled to the second gear for common rotation therewith, wherein when the shift member is in the second position the first splines matingly engage the second splines and a plurality of fourth splines that are nonrotatably coupled to a housing of the drive module.

10. The drive module of claim 1, wherein the differential assembly comprises a differential case and a differential gearset received in the differential case, the differential gearset comprising a first side gear, a second side gear, and a plurality of differential pinons that are meshingly engaged to the first and second side gears, the first side gear being coupled to the first differential output for rotation therewith, the second side gear being coupled to the second differential output for rotation therewith.

11. A drive module for a vehicle, the drive module comprising:
    a Ravigneaux gearset having a carrier, a first sun gear, a second sun gear, a plurality of first planet gears and a plurality of second planet gears, the first and second planet gears being journally supported by the carrier for rotation with the carrier about a first axis, the first planet gears being meshingly engaged to the first sun gear and the second planet gears, the second planet gears being meshingly engaged to the second sun gear;
    a first input shaft coupled to the second sun gear for rotation therewith about the first axis and adapted to receive torque from a first electric motor;
    a differential assembly having a differential input, a first differential output, and a second differential output, the differential input, first differential output, and second differential output being rotatable about a second axis that is parallel and offset from the first axis;
    a first gear coupled to the carrier for rotation therewith about the first axis, the first gear being meshingly engaged with the differential input;

a second gear coupled to the first differential output for rotation therewith about the second axis;

a second input shaft disposed about a third axis that is parallel and offset from the first axis, the second input shaft being adapted to receive torque from a second electric motor and drivingly coupled to the differential input; and a shift member disposed about the first axis and axially movable between a first position and a second position, wherein when the shift member is in the first position the shift member transmits torque between the first sun gear and the second gear, and wherein when the shift member is in the second position the shift member couples the first sun gear to a non-rotatable member of the drive module to prevent rotation of the first sun gear about the first axis.

12. The drive module of claim 11, wherein the first electric motor being drivingly coupled to the first input shaft, the second electric motor being drivingly coupled to the second input shaft.

13. The drive module of claim 12, wherein the first electric motor is disposed about the first axis and the second electric motor is disposed about the third axis.

14. The drive module of claim 11 further comprising:
a third gear coupled to the second input shaft for rotation therewith; and
a reduction gearset including an input gear and an output gear, the input gear being meshingly engaged with the third gear, the output gear being drivingly coupled to the input gear and meshingly engaged with the differential input.

15. The drive module of claim 14, wherein the input gear is coupled to the output gear for common rotation about a fourth axis that is offset and parallel to the first, second, and third axes.

16. The drive module of claim 11, wherein the shift member is movable to an intermediate position, when the shift member is in the intermediate position the first sun gear is rotatable about the first axis and is not drivingly coupled to the second gear.

17. The drive module of claim 11, further comprising a third gear rotatable about the first axis and meshingly engaged with the second gear, wherein the shift member includes a plurality of first splines, wherein when the shift member is in the first position the first splines matingly engage a plurality of second splines and a plurality of third splines, the second splines being coupled to the first sun gear for common rotation, the third splines being coupled to the third gear for common rotation therewith, wherein when the shift member is in the second position the first splines matingly engage the second splines and a plurality of fourth splines that are fixedly coupled to the non-rotatable member of the drive module.

18. The drive module of claim 17, further comprising an output shaft, the output shaft being coupled to the first sun gear for rotation therewith and extending axially through the first and third gears.

* * * * *